(12) United States Patent
Govindswamy et al.

(10) Patent No.: US 8,036,658 B2
(45) Date of Patent: Oct. 11, 2011

(54) METHOD AND APPARATUS TO IMPROVE NETWORK ACQUISITION

(76) Inventors: Arumugam Govindswamy, Irvine, CA (US); Bhaskar Patel, San Clemente, CA (US)

( * ) Notice: Subject to any disclaimer, the term of this patent is extended or adjusted under 35 U.S.C. 154(b) by 798 days.

(21) Appl. No.: 12/152,724

(22) Filed: May 16, 2008

(65) Prior Publication Data

US 2008/0287082 A1    Nov. 20, 2008

Related U.S. Application Data

(60) Provisional application No. 60/930,517, filed on May 17, 2007.

(51) Int. Cl.
H04B 7/00 (2006.01)
(52) U.S. Cl. ..................... 455/434; 455/161.1
(58) Field of Classification Search ............... 455/422.1, 455/434, 450, 452.1, 355, 161.1, 161.2, 161.3, 455/166.1, 166.2; 370/328, 329, 338
See application file for complete search history.

(56) References Cited

U.S. PATENT DOCUMENTS

| | | | |
|---|---|---|---|
| 5,475,677 | A | 12/1995 | Arnold et al. |
| 5,758,266 | A | 5/1998 | Kornfeld et al. |
| 5,809,423 | A * | 9/1998 | Benveniste ............... 455/452.2 |
| 6,028,850 | A | 2/2000 | Kang |
| 6,188,900 | B1 | 2/2001 | Ruiz et al. |
| 7,020,102 | B2 | 3/2006 | Tuomainen et al. |
| 2003/0058786 | A1 | 3/2003 | Sato et al. |
| 2003/0223480 | A1 | 12/2003 | Cafarella |
| 2009/0227220 | A1* | 9/2009 | Ishida et al. ............... 455/161.1 |
| 2010/0110988 | A1* | 5/2010 | Marinier et al. ............ 370/328 |

OTHER PUBLICATIONS

Fa Foster Dai et al., "MIMO RFIC Transceiver Designs for WLAN Applications", ASIC, 2007. 7$^{th}$ International Conference on ASIC Proceedings. © 2007 IEEE. pp. 348-351.
David G. Rah, et al., "A Fully integrated Multiband MIMO WLAN Transceiver RFIC", IEEE Journal of Solid-State Circuits, vol. 40, No. 8, Aug. 2005, 0018-9200, © 2005 IEEE, pp. 1629-1641.
John W. M. Rogers et al., "A Multiband ΔΣ Fractional-$N$ Frequency Synthesizer for a MIMO WLAN Transceiver RFIC" IEEE Journal of Solid-State Circuits, vol. 40, No. 3, Mar. 2005, 0018-9200, © 2005 IEEE, pp. 678-689.
Diego Piazza et al., "Random Beamforming for Spatial Multiplexing in Downlink Multiuser MIMO Systems", 2005 IEEE 16th International Symposium on Personal, Indoor and Mobile Radio Communications, 978-3-8007-2909-8/05, © 2005 IEEE, pp. 2161-2165.

* cited by examiner

Primary Examiner — Thanh Le
(74) Attorney, Agent, or Firm — Lerner, David, Littenberg, Krumholz & Mentlik, LLP

(57) ABSTRACT

The present invention provides architectures and methods which use multiple radio receive chains in mobile devices to provide enhanced performance, such as when acquiring and maintaining network access. A plurality of receive chains simultaneously perform signal level measurements across one or more measurement cycles. The number of RF channels upon which measurements are performed may be determined adaptively/dynamically. One or more criterion may be used to set signal level thresholds. If a measured signal for a given channel fails to satisfy a threshold, then that RF channel may be removed from the network acquisition process. If a measured signal for a channel exceeds another threshold, then that channel may be employed in further network acquisition processes, such as identifying potential beacon signal channels, verifying beacon signal channels and synchronizing the device to one of the beacon channels.

26 Claims, 13 Drawing Sheets

FIG. 6

| Number | RF Profile Name | Channel Bandwidth (MHz) | FFT Size | Center Frequency Step (KHz) | $F_{start}$ (MHz) | $N_{range}$ |
|---|---|---|---|---|---|---|
| 1 | Prof1.A_2.3 | 8.75 | 1024 | 250 | 2304.5 | {0, …, 364} |
| 2 | Prof1.B_2.3-5 | 5.0 | 512 | 250 | 2302.5 | {0, …, 380} |
|   | Prof1.B_2.3-10 | 10.0 | 1024 | 250 | 2305.0 | {0, …, 360} |
| 3 | Prof2.A_2.305 | 3.5 | 512 | 250 | 2306.75 and 2346.75 | {0, …, 46} |
| 4 | Prof2.B_2.305 | 5 | 512 | 250 | 2307.5 and 2347.5 | {0, …, 46} |
| 5 | Prof2.C_2.305 | 10 | 1024 | 250 | 2310 and 2350 | {0, …, 20} |
| 6 | Prof3.A_2.496 – 5 | 5 | 512 | 250 / 200 | 2498.5 | {0, …, 756} |
|   | Prof3.A_2.496 – 10 | 10 | 1024 | 250 / 200 | 2501 | {0, …, 736} |
| 7 | Prof4.A_3.3 | 5 | 512 | 250 | 3302.5 | {0, …, 380} |
| 8 | Prof4.B_3.3 | 7 | 1024 | 250 | 3303.5 | {0, …, 372} |
| 9 | Prof4.C_3.3 | 10 | 1024 | 250 | 3305 | {0, …, 360} |
| 10 | Prof5.A_3.4 | 5 | 512 | 250 | 3402.5 | {0, …, 1580} |
|   | Prof5L.A_3.4 | 5 | 512 | 250 |  | {0, …, 780} |
|   | Prof5H.A_3.4 | 5 | 512 | 250 |  | {800, …, 1580} |
| 11 | Prof5.B_3.4 | 7 | 1024 | 250 | 3403.5 | {0, …, 1572} |
|   | Prof5L.B_3.4 | 7 | 1024 | 250 |  | {0, …, 772} |
|   | Prof5H.B_3.4 | 7 | 1024 | 250 |  | {800, …, 1572} |
| 12 | Prof5.C_3.4 | 10 | 1024 | 250 | 3405 | {0, …, 1560} |
|   | Prof5L.C_3.4 | 10 | 1024 | 250 |  | {0, …, 860} |
|   | Prof5H.C_3.4 | 10 | 1024 | 250 |  | {800, …, 1560} |

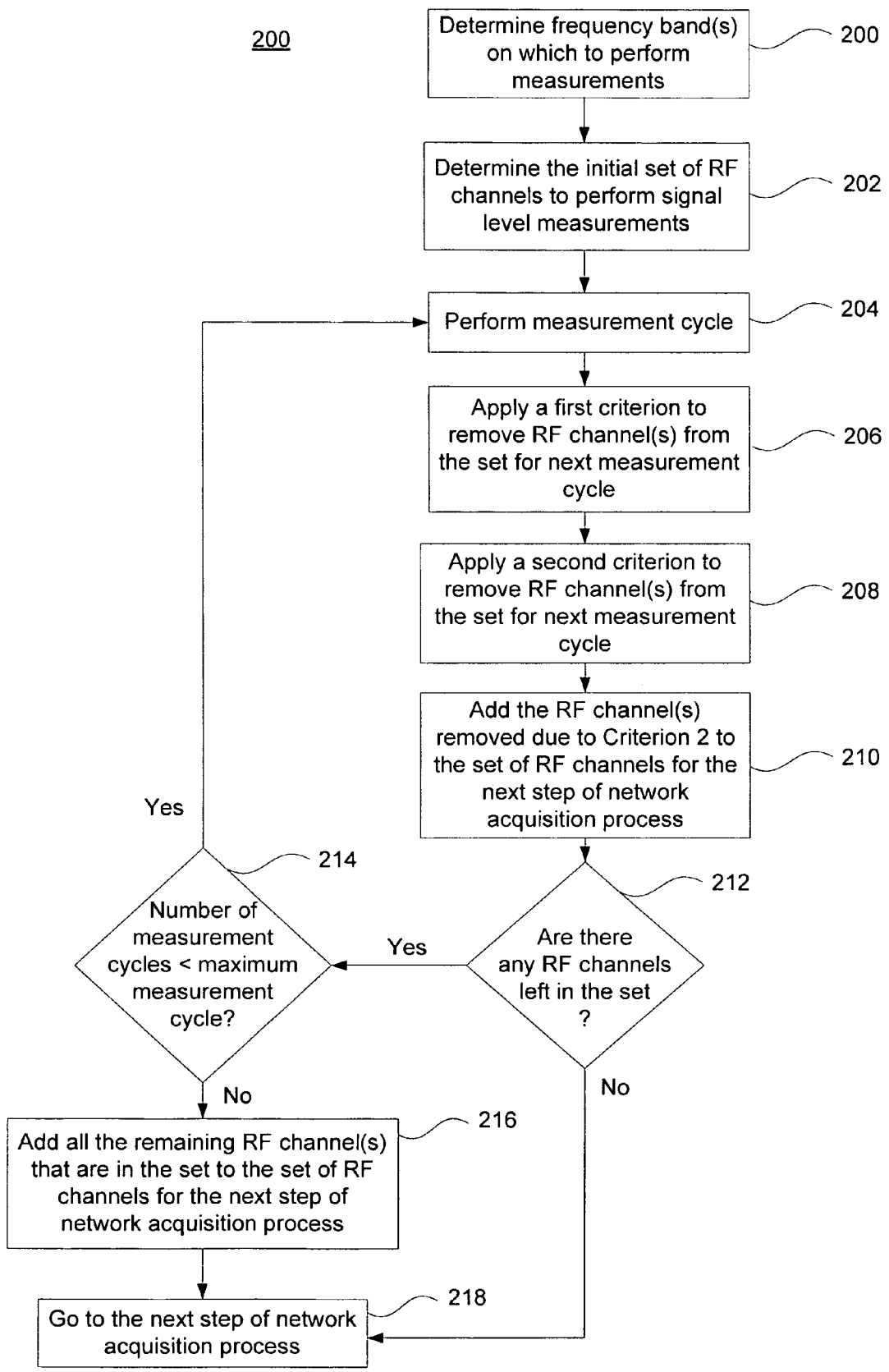

METHOD AND APPARATUS TO IMPROVE NETWORK ACQUISITION

CROSS-REFERENCE TO RELATED APPLICATION

This application claims the benefit of U.S. Provisional Patent Application No. 60/930,517, filed May 17, 2007 and entitled "Use of Multiple Receive Chains to Improve Network Acquisition," the entire disclosure of which is hereby expressly incorporated by reference herein. This application is related to U.S. patent application Ser. No. 12/074,919, filed Mar. 7, 2008 and entitled "Multiple Radio Receive Chain Wireless Communication Devices," the entire disclosure of which is hereby expressly incorporated by reference herein.

BACKGROUND OF THE INVENTION

1. Field of the Invention

The present invention relates generally to wireless communication systems and, more particularly, to methods and receiver architectures in client terminals for signal level measurements during network acquisition.

2. Description of Related Art

Client terminals used in wireless communication systems are required to search for the network, acquire the network information, register and camp on to the network. The aforementioned process is collectively called "network acquisition." The network acquisition process would normally take place in different scenarios that include but are not limited to powering on the client terminal, an attempt to obtain service after a loss of network coverage (e.g., a dropped call due to a "dead spot" in the network), and upon roaming from one network to another. In many situations the signal level measurements performed as part of the network acquisition process may take a long time, such as up to several seconds or longer. Such delays may adversely impact client terminal performance and user satisfaction.

An example of a cellular wireless network is provided in FIG. 1. As shown in the figure, cellular-type wireless communication system 10 comprises elements such as a client terminal or mobile station 12 and base stations 14. Other network devices which may be employed, such as a mobile switching center, are not shown. As illustrated, the communication path from the base station ("BS") to the client terminal direction is referred to herein as the downlink ("DL") and the communication path from the client terminal to the base station direction is referred to herein as the uplink ("UL"). In some wireless communication systems the client terminal or mobile station ("MS") communicates with the BS in both DL and UL directions. For instance, this is the case in cellular telephone systems. In other wireless communication systems the client terminal communicates with the base stations in only one direction, usually the DL. This may occur in applications such as paging.

As shown in FIG. 2, client terminal/MS 12 typically contains a baseband subsystem 16 and a radio frequency ("RF") subsystem 18. Memory 20, such as an external memory, is shown connected to the baseband subsystem 16. The baseband subsystem 16 normally includes a micro controller unit ("MCU") 22, a signal processing unit ("SPU") 24, data converters 26, peripherals 28, power management 30, and memory 32 as shown in FIG. 3. The SPU 24 may be a digital signal processor ("DSP"), hardware ("HW") accelerators, co-processors or a combination of the above. Normally the overall control of the baseband subsystem 16 is performed by software running on the MCU 22 and the processing of signals is done by the SPU 24.

Analog to digital converters ("ADCs") convert a received analog signal into digital for the baseband system to process it. Similarly, digital to analog converters ("DACs") convert the processed baseband digital signal into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally contains a receiver, a transmitter, a synthesizer, a power amplifier, an antenna, and other components. An RF subsystem 18 for a time division duplex ("TDD") system is shown in FIG. 4. Receiver section 34 performs the task of converting the signal from RF to baseband. It includes mixers 36, filters 38, low noise amplifiers ("LNAs") 40 and variable gain amplifiers ("VGAs") 42. Transmitter section 44 performs the task of converting the baseband signal up to the RF. It includes mixers 46, filters 48, and gain control through VGAs 50. Power amplification of the transmit signal is typically done by a separate power amplifier ("PA") unit 52 but is considered part of the transmit RF chain. In some architectures, some of the components of the receiver and transmitter can be shared. As shown, the receiver section 34 and the transmitter section 44 are coupled to an antenna 54 via a transmit/receive switch 56. Synthesizer 58 is also shown as coupling to the receiver section 34 and the transmitter section 44.

Often, multiple receive and transmit chains are used in wireless communication systems to improve performance. The performance improvement can be in terms of better coverage, higher data rates, multiplexing of multiple users on the same RF channel at the same time, or some combination of the above. FIG. 5 illustrates an RF subsystem 60 with two RF receive chains.

As shown, RF subsystem 60 includes a transmitter 62, a synthesizer 64, and a pair of receivers $66_1$ and $66_2$. One of the receivers, $66_1$, and the transmitter 62 are coupled to a first antenna $68_1$ via transmit/receive switch 70. The other receiver, $66_2$, is connected to a second antenna $68_2$. In this type of RF subsystem, whenever the multiple receive chains are used they are all tuned to the same RF channel.

While such approaches may provide an acceptable level of performance, it is desirable to provide improved signal level measurement techniques that improve the network acquisition process.

SUMMARY OF THE INVENTION

In accordance with an embodiment of the present invention, a method comprises providing a wireless receiver for operating on a wireless communication system having a plurality of channels, the wireless receiver having a plurality of receive chains for receiving signals from the plurality of channels; determining an initial set of channels to perform signal level measurements on; performing an initial measurement cycle on the initial set of channels using the plurality of receive chains, the plurality of receive chains tuning simultaneously to different channels in the initial set and returning a corresponding initial set of signal level measurements for each of the channels in the initial set of channels; applying a criterion to each initial signal level measurement for each channel in the initial measurement cycle; and generating an updated set of channels to perform a subsequent measurement cycle on based on the criterion; wherein if a given initial signal level measurement for a given channel satisfies the criterion, then the given channel is omitted from the updated set of channels to perform the subsequent measurement cycle on.

In one example, the criterion is a signal level threshold corresponding to a minimum signal level sufficient to obtain service on the wireless communication system. In another example, the criterion is a signal level threshold corresponding to a minimum signal level above which the given initial signal level measurement qualifies for consideration as a beacon signal. If the given initial signal level measurement satisfies the criterion, then the method further comprises adding the given channel to a list of potential beacon signal channels.

In yet another example, the method further comprises performing the subsequent measurement cycle on the updated set of channels using the plurality of receive chains. The plurality of receive chains are tuned simultaneously to different channels in the updated set and returning a subsequent set of signal level measurements. In this case, the method may further comprise applying the criterion to each subsequent signal level measurement for each channel in the updated set after the subsequent measurement cycle.

In yet another example, the method further comprises assigning a first group of the initial set of channels to a first one of the plurality of receive chains and assigning a second group of the initial set of channels to a second one of the plurality of receive chains prior to performing the initial measurement cycle. In this case, the first group may be a set of even-numbered channels and the second group may a set of odd-numbered channels.

In a further example, the criterion is a first criterion associated with a first threshold and the step of applying the criterion further includes applying a second criterion associated with a second threshold to each initial signal level measurement for each channel in the initial measurement cycle. In this case, if the given initial signal level measurement for the given channel does not exceed the first threshold, then the given channel is omitted from the updated set of channels. If the given initial signal level measurement for the given channel exceeds the second threshold, then the given channel is qualified for consideration as a beacon signal and the given channel is omitted from the updated set of channels. And if the given initial signal level measurement for the given channel exceeds the first threshold and does not exceed the second threshold, then the given channel is added to the updated set of channels. In an alternative, the second criterion is only applied to the initial signal level measurement of a selected channel if that measurement exceeds the first threshold.

In another example, the method further comprises assigning even numbered ones of the initial set of channels to a first one of the plurality of receive chains for the initial measurement cycle and assigning odd numbered ones of the initial set of channels to a second one of the plurality of receive chains for the initial measurement cycle. Then odd numbered ones of the updated set of channels are assigned to the first one of the plurality of receive chains for the subsequent measurement cycle and even numbered ones of the updated set of channels are assigned to the second one of the plurality of receive chains for the initial measurement cycle.

In accordance with another embodiment of the present invention, an RF subsystem for use in a wireless device is provided. The RF subsystem comprising a transmitter, a plurality of synthesizers and a plurality of receive chains. The transmitter is operable to process input signals and to send out the processed input signals from the wireless device. A first one of the plurality of synthesizers is operable to generate a first local oscillating signal in response to a first synthesizer control signal. A second one of the plurality of synthesizers is operable to generate a second local oscillating signal in response to a second synthesizer control signal. The plurality of receive chains are operable to receive a plurality of signals from a corresponding plurality of channels in a wireless communication network, to analyze the plurality of received channel signals and to output selected ones of the received channel signals in a network acquisition process. A first one of the plurality of receive chains receives the first local oscillating signal from the first synthesizer and tunes to a first set of the plurality of channels during a first measurement cycle based on the first local oscillating signal and sequentially measures each received channel signal for the first set of channels. A second one of the plurality of receive chains receives the second local oscillating signal from the second synthesizer and tunes to a second set of the plurality of channels during the first measurement cycle based on the second local oscillating signal and sequentially measures each received channel signal for the second set of channels. The first and second receive chains are tuned simultaneously to different channels during the first measurement cycle.

In one alternative, the first set of channels comprises odd numbered channels in a frequency band of the wireless communication network and the second set of channels comprises even numbered channels in the frequency band.

In another alternative, during a second measurement cycle the first receive chain tunes to at least some of the second set of channels and sequentially measures each received channel signal for at least some of the second set of channels. And the second receive chain tunes to at least some of the first set of channels and sequentially measures each received channel signal for at least some of the first set of channels.

In a further alternative, if there is an odd number of channels then one of the first and second receive chains is not used for signal level measurements during a last measurement event in the measurement cycle.

In another alternative, after the received channel signals for the first and second sets of channels are measured, a criterion is applied to each measurement. Here, if a given measurement satisfies the criterion, then the channel corresponding to the given measurement is not included in an updated channel set for use in a subsequent measurement cycle.

In one example, if there is an odd number of channels during the subsequent measurement cycle, then one of the first and second receive chains is not used for signal level measurements during a last measurement event in the subsequent measurement cycle.

In another example, channels remaining in the updated channel set are regrouped to maximize time and spatial diversity for the subsequent channel measurement cycle.

In a further example, the criterion is a first criterion associated with a first threshold. Here, applying the criterion further includes applying a second criterion associated with a second threshold to each measurement. If the given measurement does not exceed the first threshold, then the channel corresponding to the given measurement is omitted from the updated channel set. If the given measurement exceeds the second threshold, then the channel corresponding to the given measurement is qualified for consideration as a beacon signal and the corresponding channel is omitted from the updated channel set. And if the given measurement exceeds the first threshold and does not exceed the second threshold, then the corresponding channel is added to the updated channel set.

In such an example, the second criterion may only applied to the given measurement if that measurement exceeds the first threshold.

In other alternatives, the wireless device may be a mobile station or a base station.

In accordance with a further embodiment of the present invention, a wireless mobile station for use on a wireless communication network is provided. The wireless mobile station comprising a baseband subsystem and a radio frequency subsystem. The baseband subsystem includes a controller and a signal processing unit operatively connected to the controller. The radio frequency subsystem is operatively connected to the baseband subsystem. The radio frequency subsystem includes a plurality of receive chains that are operable to receive a plurality of signals from a corresponding plurality of channels in the wireless communication network, to analyze the plurality of received channel signals and to output selected ones of the received channel signals in a network acquisition process. A first one of the plurality of receive chains tunes to a first set of the plurality of channels during a channel measurement cycle and sequentially measures each received channel signal for the first set of channels. A second one of the plurality of receive chains tunes to a second set of the plurality of channels during the channel measurement cycle and sequentially measures each received channel signal for the second set of channels. The first and second receive chains tune simultaneously to different channels during the channel measurement cycle.

In an alternative, one of the baseband subsystem and the radio frequency subsystem further comprises a controller for managing one or more thresholds used to analyze the received channel signals in the network acquisition process.

In one example, if a measured channel signal does not exceed a first threshold, then the channel corresponding to the measured channel signal is omitted from an updated channel set in a subsequent channel measurement cycle. And if the measured channel signal exceeds a second threshold, then the channel corresponding to the measured channel signal is qualified for consideration as a beacon signal in the network acquisition process and the corresponding channel is omitted from the updated channel set.

In another example, the channel measurement cycle is a first measurement cycle. Here, the one or more thresholds are used to remove channels from evaluation for a subsequent channel measurement cycle. The first and second sets of channels may then be regrouped to maximize time and spatial diversity for the subsequent channel measurement cycle.

In this case, the remaining channels may be regrouped and the plurality of receive chains may be reassigned prior to a given measurement cycle to maximize time and spatial diversity and to reduce power consumption during the given channel measurement cycle.

BRIEF DESCRIPTION OF THE DRAWINGS

FIG. 6 is a table illustrating exemplary RF profiles for an OFDMA system.

FIG. 9 illustrates a flow diagram of a process for signal acquisition and processing in accordance with aspects of the present invention.

DETAILED DESCRIPTION

Figure 1:
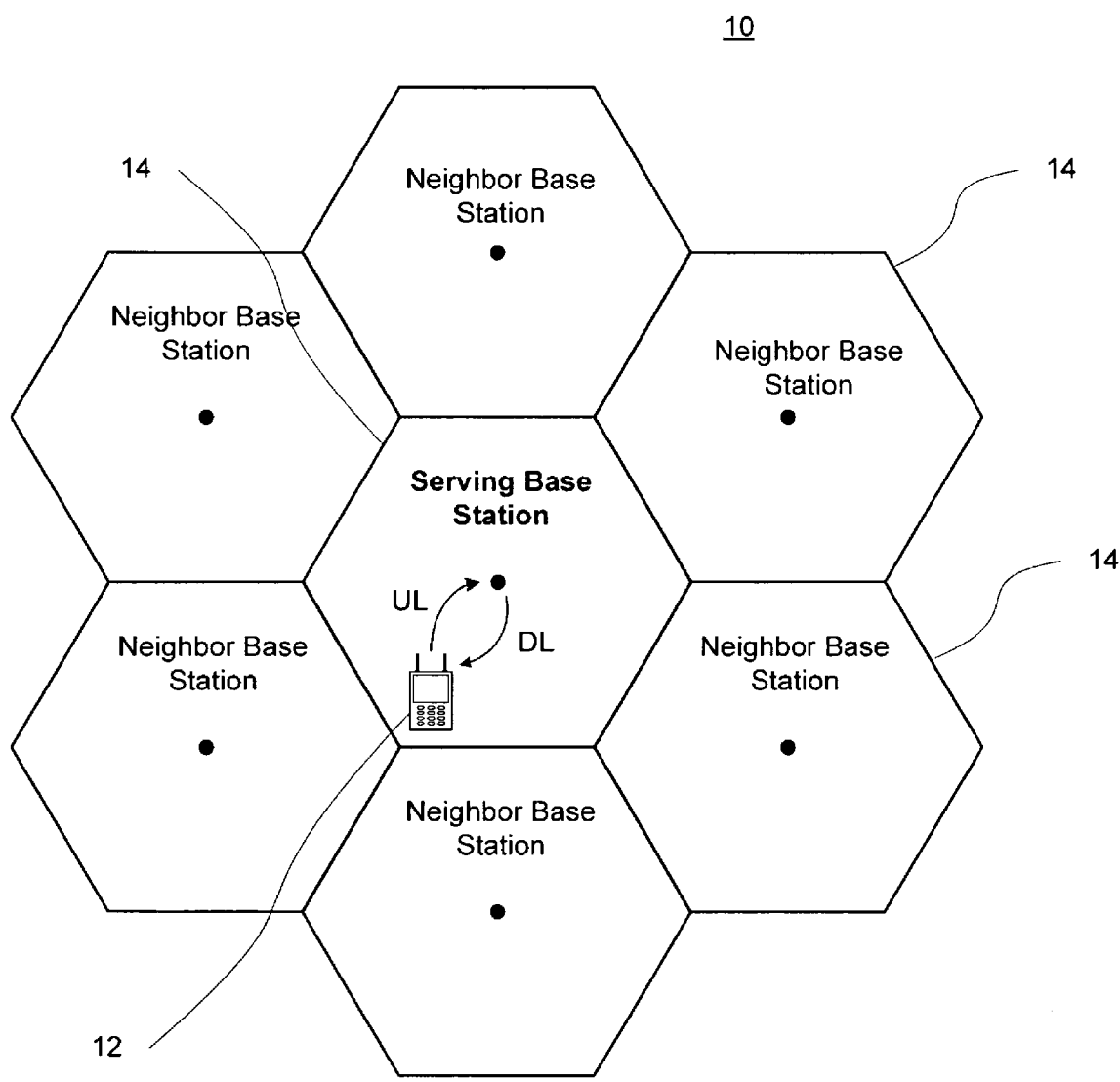
FIG. 1 illustrates a conventional wireless cellular communication system.
Figure 2:
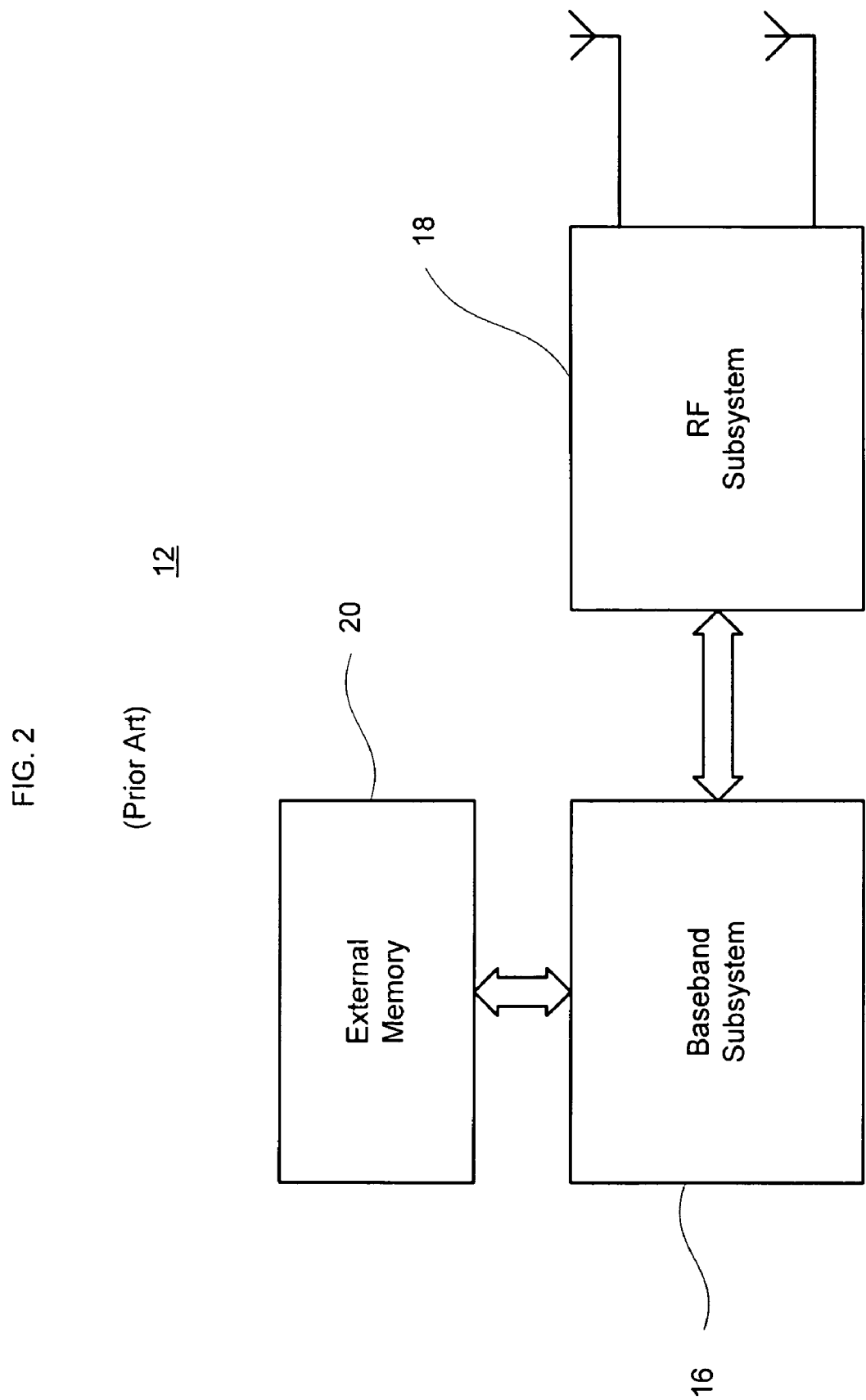
FIG. 2 illustrates a wireless mobile station diagram.
Figure 3:
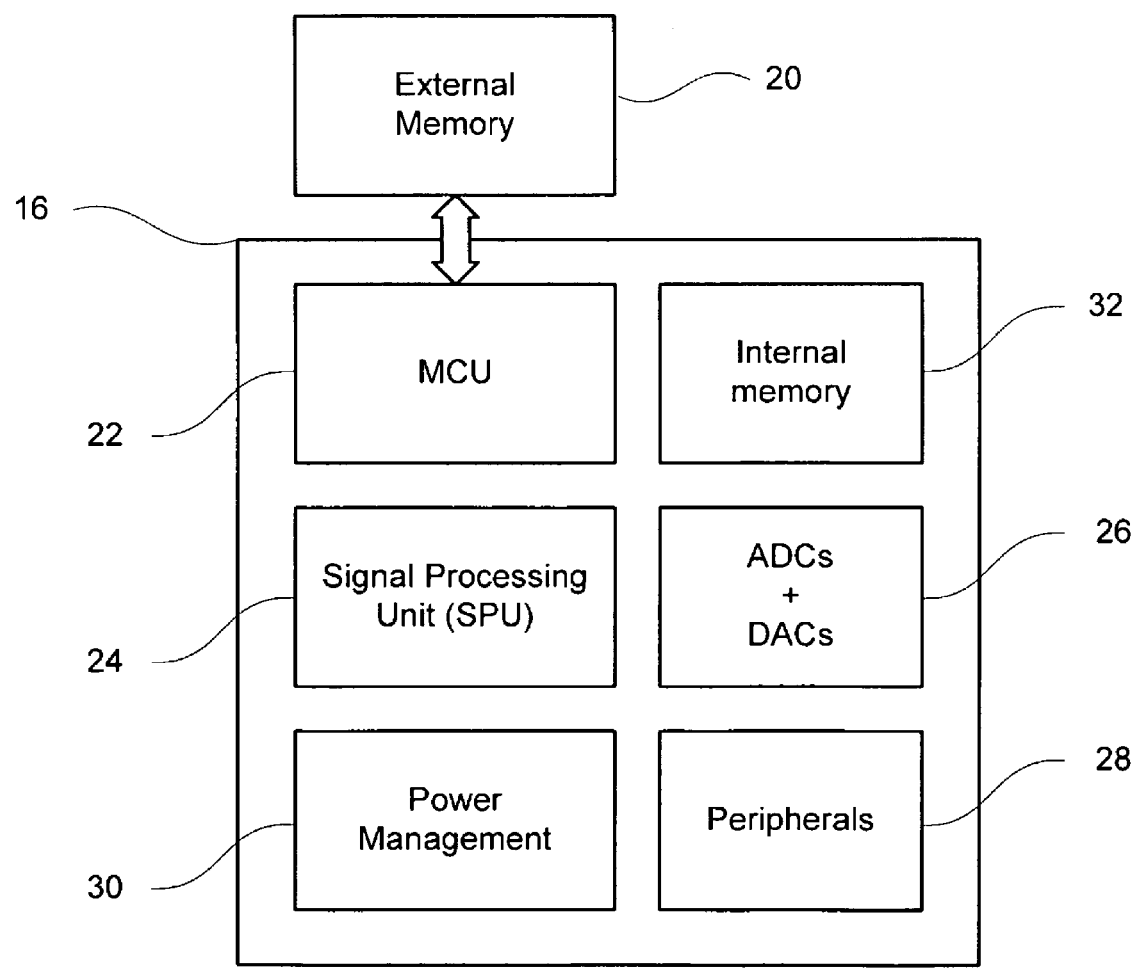
FIG. 3 illustrates a baseband subsystem for a wireless mobile station.
Figure 4:
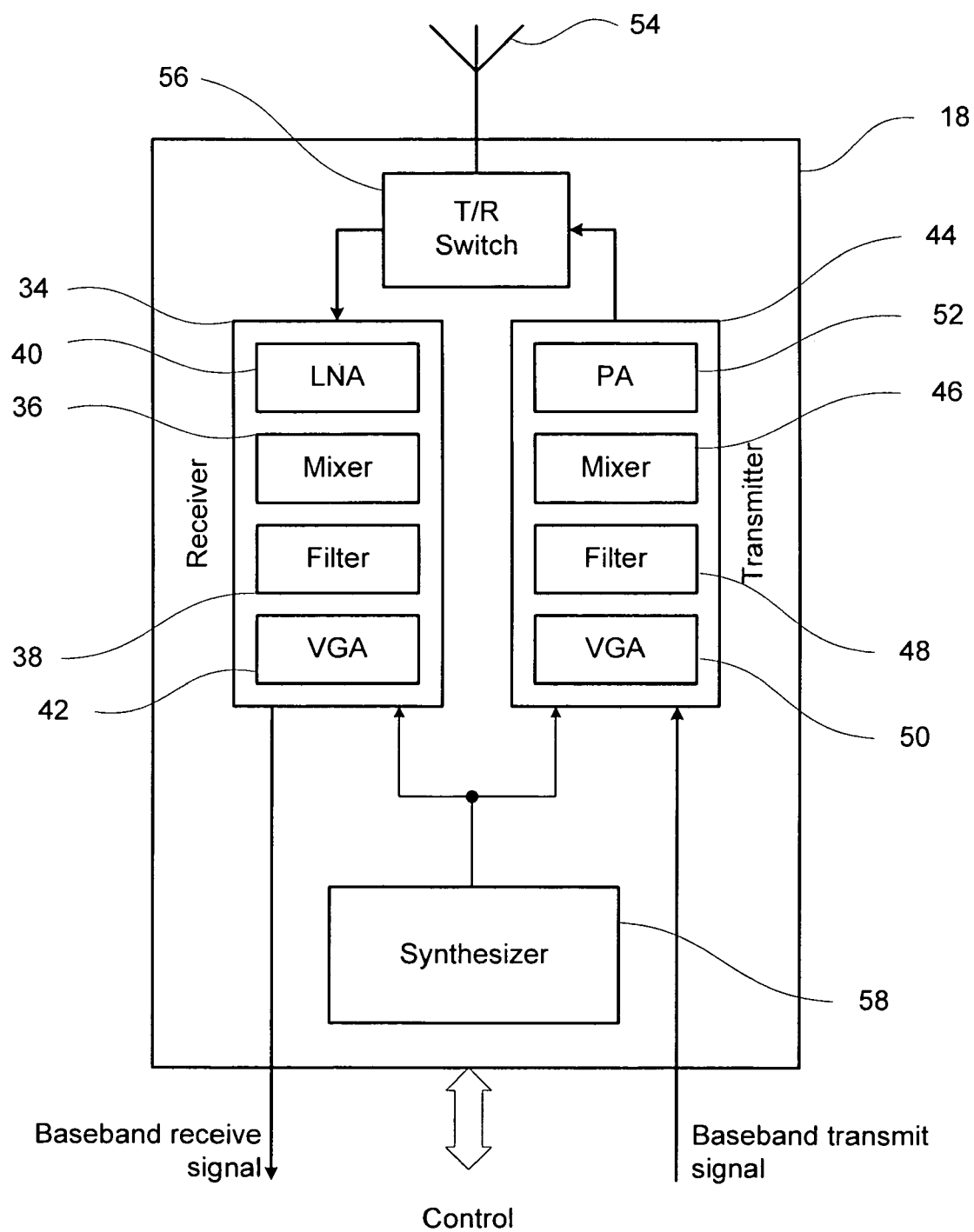
FIG. 4 illustrates an RF subsystem for a wireless mobile station.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

Normally, for a given wireless communication system, the radio frequency band is divided into multiple RF channels. As used herein, the term RF encompasses, but is not limited to the frequency range from 300 MHz to 30 GHz. By way of example only, RF may encompass lower frequency ranges such as very high frequency ("VHF") from 30 MHz to 300 MHz or even lower. RF may also encompass higher frequency ranges such as extremely high frequency ("EHF") in the range of 30 GHz to 300 GHz or higher. To efficiently use the radio frequency spectrum, wireless communication systems are designed to allow the scalability and flexibility of operating in different frequency bands using different channel bandwidths and RF channel positions. To support this flexibility in wireless communication networks, it is desirable that the client terminal be able to dynamically detect the radio frequency band of operation and the most suitable RF channel on which the service may be available. The suitability of an RF channel may be decided by different metrics such as signal strength, signal quality, etc.

Many wireless communication systems use large numbers of RF channels over different frequency bands. Thus, during operation, a given client terminal makes signal level measurements to choose the most suitable RF channel for communication. To make such signal level measurements the client terminal may need to tune to all possible RF channels in the wireless communication system.

For example, Global System for Mobile Communication ("GSM") can operate in many frequency bands such as GSM 850 MHz, GSM 900 MHz, DCS 1800 MHz, PCS 1900 MHz, etc., with such bands employing a 200 KHz channel bandwidth. Another example of a wireless communication system that can operate in many frequency bands is the IEEE 802.16e system. This system can operate in 2.3 GHz, 2.496 GHz, 3.3 GHz, 3.4 GHz, etc. with different channel bandwidths such as 3.5 MHz, 5 MHz, 7 MHz, 8.75 MHz, 10 MHz, etc. Here, channel positions may be at any integral multiple of 250 KHz in the respective frequency bands.

The deployment scenarios of wireless communication system can vary depending on various factors. For example the GSM system may be deployed at GSM 900 MHz and DCS 1800 MHz in one geographical region, whereas the GSM system may be deployed at GSM 850 MHz and PCS 1900 MHz in another geographical region. In another example, the IEEE 802.16e wireless communication system may be deployed at 2.3 GHz with 8.75 MHz channel bandwidth in one geographical region, where as the IEEE 802.16e wireless communication system may be deployed at 2.496 GHz with 5 MHz channel bandwidth in another geographical region.

The frequency band of operation, the channel bandwidth and the channel position may be collectively referred to herein as a "radio profile." Client terminals in a given wireless communication system may not have a priori knowledge about the actual radio profile being used by the system. A client terminal in such a system needs to determine the actual radio profile being used by the system. The determination of the radio profile may be required under different circumstances as noted above, such as during power on of the client terminal, recovering after a loss of network coverage, or roaming to a new network. The process of detecting radio profile(s) on which service available requires lot of signal level measurements.

Many wireless communication systems transmit a beacon signal for detection and synchronization purposes. As a part of the network acquisition process the client terminal detects and synchronize with the wireless communication system using the beacon signal. It may take several steps for the client terminal to detect the radio profile and synchronize with the wireless communication system. Typical steps involved during the network acquisition process by the client terminal include:

1. Performing signal level measurements on the required RF channels in the required frequency bands;
2. Identifying the channels that may be potential beacon signal channels;
3. Verifying the selected channels as beacon signal channel;
4. Synchronizing the client terminal to one of the beacon signal channels of wireless communication system; and
5. Receiving additional system information from the wireless communication network and register the MS/client terminal on the network. The system information normally provides information about the network, available services, etc.

Such steps may be employed in many of the wireless communication systems. However the details of each step may vary from one system to another.

Initially, the required frequency bands and the required RF channels used for the network acquisition process may be based on many criteria. Examples of such criteria include a priori information such as one or more previously successful radio profile detection(s) which may be stored in a non-volatile memory of the client terminal; user-preferred radio profiles; and all RF channels in all frequency bands supported by the client terminal. The set of RF channels selected by the above criteria is referred herein as initial set.

It is important to choose the most suitable set of RF channels during the early steps of the aforementioned network acquisition process, such as in the steps where signal level measurements are performed and potential beacon signal channels are identified and selected for further steps of the network acquisition process. The suitability of an RF channel may be decided by different metrics such as signal strength, signal quality, etc. which are obtained through measurements. If the set of RF channels selected for further processing turns out not to be suitable, there may be a significant penalty in both time and power consumption by performing unnecessary subsequent network acquisition steps on RF channels that are not suitable. For example, in IEEE 802.16 systems, a potential beacon channel can be verified as a beacon channel by performing a preamble search procedure on that RF channel. The preamble search procedure is normally of longer duration and consumes significant power.

In order to understand variations in radio profiles, an example is provided for a wireless communication system in accordance with the IEEE 802.16e standard. This standard includes an Orthogonal Frequency Division Multiple Access ("OFDMA") based physical layer, which can use any of the radio profiles listed in the table of FIG. 6. A number of different radio profiles are shown. Each radio profile has its own RF profile name. The channel bandwidth, center frequency step, start frequency ($F_{start}$) and number of channel positions ($N_{range}$) are listed for each. While additional profiles may be added, important attributes of the radio profiles of IEEE 802.16e system for initial steps of network acquisition process are the frequency band of operation and the channel bandwidth.

Although detecting a given radio profile may involve several steps, the initial steps are identification of frequency band of operation and beacon signal channel. This typically can be determined by signal level measurements in all the required RF channels in the required frequency bands supported by the wireless communication system and the client terminal. Note that for each profile there are hundreds of channel positions as shown in FIG. 6.

The fine resolution in channel position for a given frequency band allows deployment flexibility. For example, the profile Prof1.A__2.3 in FIG. 6 contains a total of 365 (0, . . . , 364) channel positions even though there may be at most 10 actual channels that can be deployed in that frequency band. The client terminal may need to analyze all of the possible positions when detecting the radio profile in a worst case scenario.

As can be seen in FIG. 6, for the 2.3 GHz frequency band there are four possible channel bandwidths (3.5 MHz, 5.0 MHz, 8.75 MHz and 10.0 MHz). For each channel bandwidth and channel position combination, the client terminal may need to perform multiple signal level measurements. After the signal level measurements are performed, an appropriate set of RF channels may be selected for the next steps of the network acquisition process.

For a given RF channel, the duration of each signal level measurement and the total number of measurements are chosen such that the measured signal strength and the signal quality metrics have high reliability. The higher reliability of the signal strength and signal quality metrics lead to the selection of the most suitable set of RF channels for subsequent steps of a network acquisition process. Various factors may be of particular importance when considered in choosing the number and duration of the signal level measurements. Some of these factors depend on the air-interface of the specific wireless communication system under consideration while others such as fading and interference are common to all wireless communication systems. For example, to counter the effect of fading, multiple signal level measurements on the same RF channel may be performed. These multiple measurements may be distributed over time to achieve time diversity in the signal level measurements.

In view of the above, thousands of signal level measurements may be needed in many cases due to a wide range of combinations of frequency band of operation, channel bandwidths, channel positions and the need to perform multiple measurements on each RF channel. Thus, the signal level measurements step of the network acquisition process may take a long time. This may lead the client terminal to take long time to register to the wireless communication network and be available for service.

Often the client terminals in a wireless communication system are battery operated devices. Thus, another issue of concern is power consumption by such devices. Furthermore, network acquisition may be required in several scenarios. These scenarios include when the client terminal powers on, when the client terminal is looking to reacquire network service, when the client terminal roaming to a new service area, etc.

The signal level measurement process may include one or more measurement cycles. In a given measurement cycle, one measurement may be performed on a set of RF channels. The time taken to perform one measurement cycle is referred herein as the "measurement cycle time." A measurement cycle comprises one or more individual measurement events. During each measurement event, the client terminal tunes the RF receive chain to an RF channel and performs a measurement on that RF channel. If the RF subsystem comprises multiple RF receive chains, it may be possible to make multiple measurements during a single measurement event.

Figure 7:
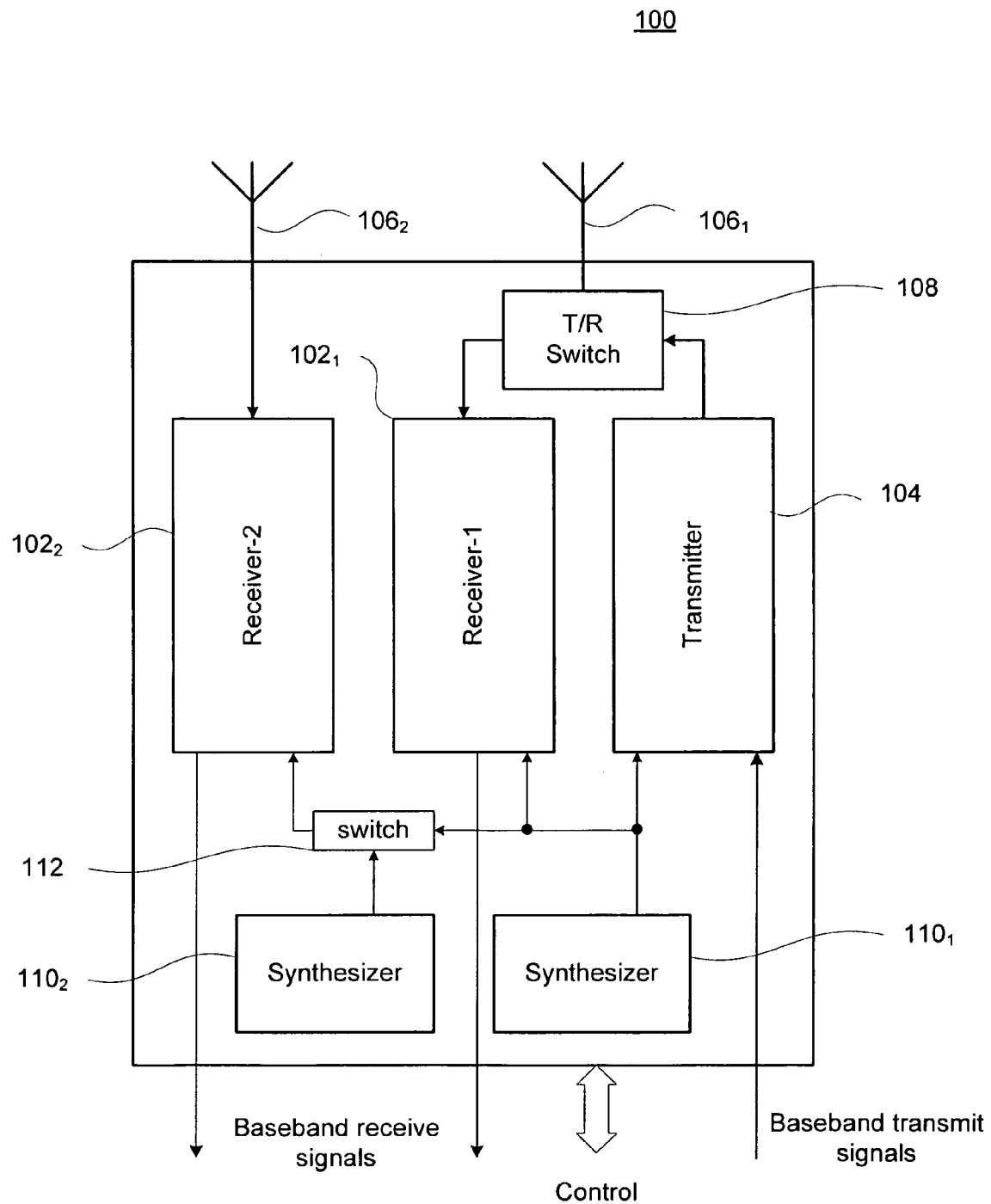
FIG. 7 illustrates an RF receive subsystem in accordance with aspects of the present invention.

In accordance with an embodiment of the present invention, FIG. 7 illustrates an example of an RF subsystem with two RF receive chains. Here, the RF receive chains can be simultaneously tuned to different RF channels or the same RF channel. As shown, RF subsystem 100 has two RF receive chains $102_1$ and $102_2$ for a TDD wireless communication system. Here, transmitter 104 and receive chain $102_1$ are coupled to a first antenna $106_1$ via a transmit/receive switch 108. The receive chain $102_2$ is coupled to a second antenna $106_2$. The transmitter 104 and receive chain $102_1$ are also coupled to synthesizer $110_1$. Receive chain $102_2$ is coupled to synthesizer $110_1$ and to synthesizer $110_2$ via a switch mechanism 112.

In FIG. 7, the receive chain $102_1$ can be tuned by synthesizer $110_1$ only. In contrast, receive chain $102_2$ can be tuned either by synthesizer $110_1$ or by synthesizer $110_2$. To tune both receive chains $102_1$ and $102_2$ to the same RF channel, the switch mechanism 112 passes signals from synthesizer $110_1$ to the receive chain $102_2$. For this case, the synthesizer $110_2$ is turned off, put into standby mode or otherwise disabled to save power, although this is not required. To tune receive chains $102_1$ and $102_2$ to different RF channels, the switch mechanism 112 passes signals from synthesizer $110_2$ to the receive chain $102_2$.

Switch mechanism 112 may be a physical switch that may be, e.g., implemented in hardware and controlled by software or firmware through control lines connecting the switch mechanism 112 to a controller (not shown). Baseband transmit signals may be applied to transmitter 104 from a baseband subsystem such as baseband subsystem 16. Similarly, baseband receive signals may also be sent from receive chains $102_1$ and $102_2$ to the baseband subsystem. Overall control of the RF subsystem 100 may be provided by a controller or a signal processing unit, for instance the controller or signal processing unit in the baseband subsystem.

The above example of an RF subsystem with two RF receive chains as shown in FIG. 7 may be generalized to RF subsystems with any combination of two or more RF receive chains.

Figure 8A:
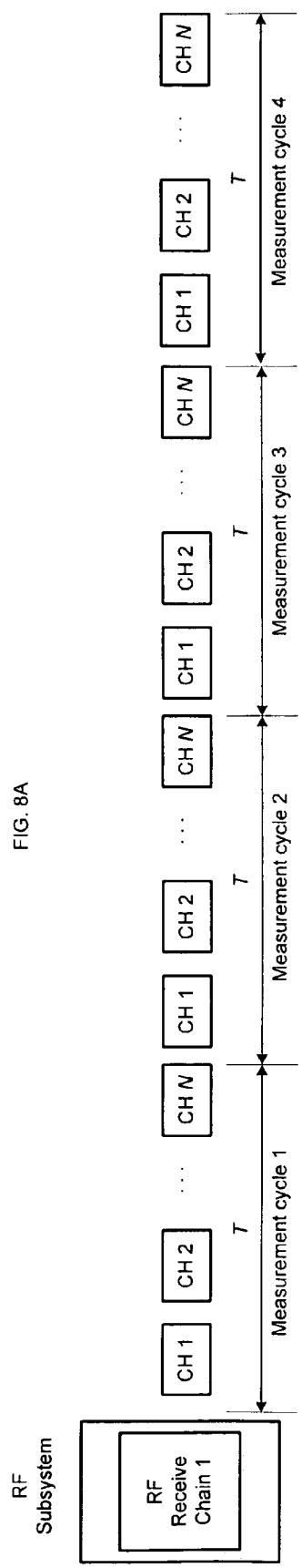
FIG. 8A illustrates a single receive chain signal level measurement process.

An example of a signal level measurement step for an RF subsystem with one RF receive chain is shown in FIG. 8A. In this example, signal level measurements on a set of N RF channels are performed. For each RF channel four measurements are taken. To achieve time diversity in this case, signal level measurements are performed such that measurements for all RF channels are taken before repeating measurements on the same set of RF channels. The time taken to perform one measurement using one RF receive chain on a set of N RF channels is T as shown in FIG. 8A. For this example, the signal level measurement process performs four such measurement cycles to get four measurements on all the RF channels in the set. The total time required to perform four measurements for the set of N RF channels is 4T as shown in FIG. 8A.

Figure 5:
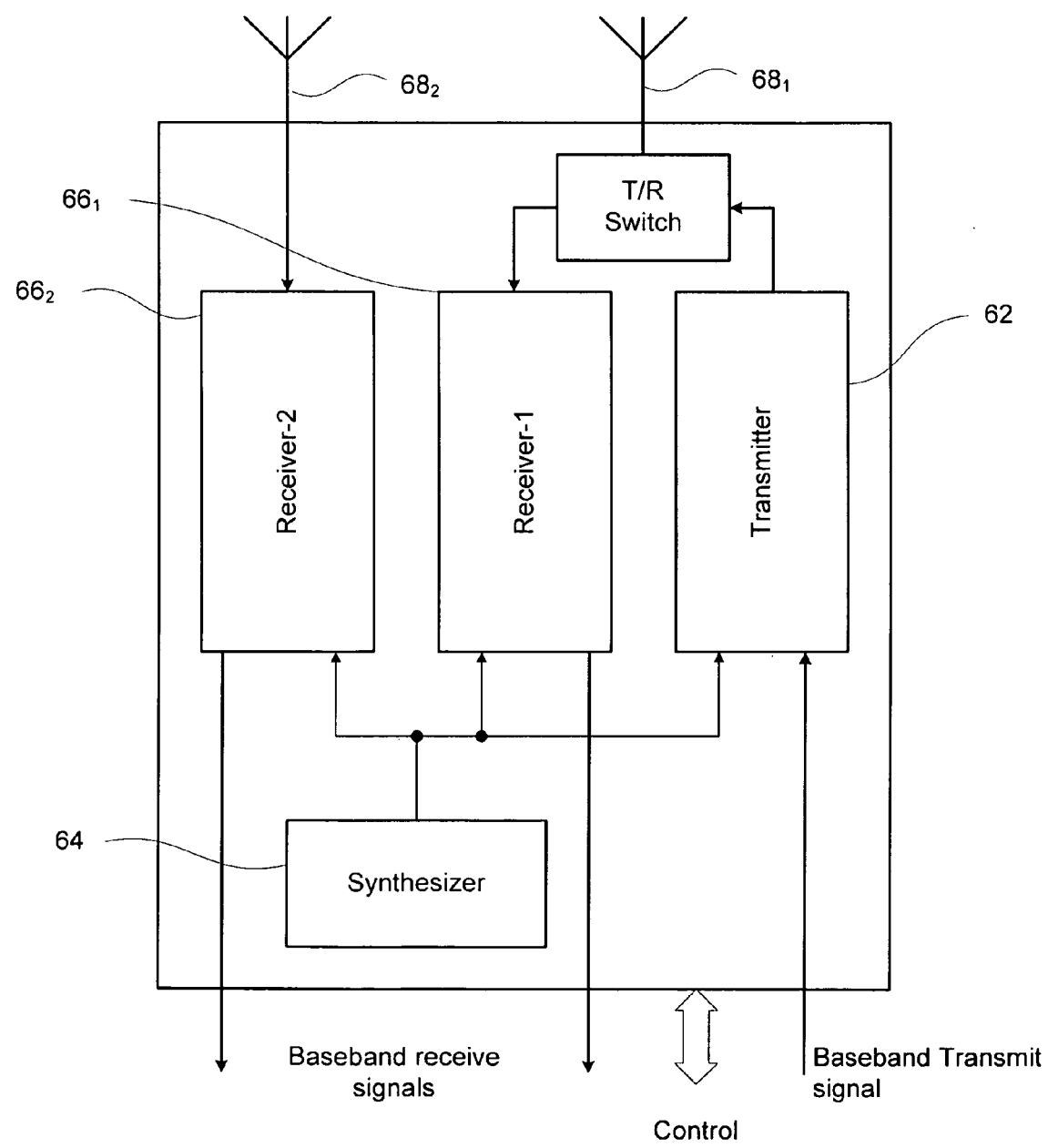
FIG. 5 illustrates an RF subsystem for a wireless mobile station having two receive chains.
Figure 8B:
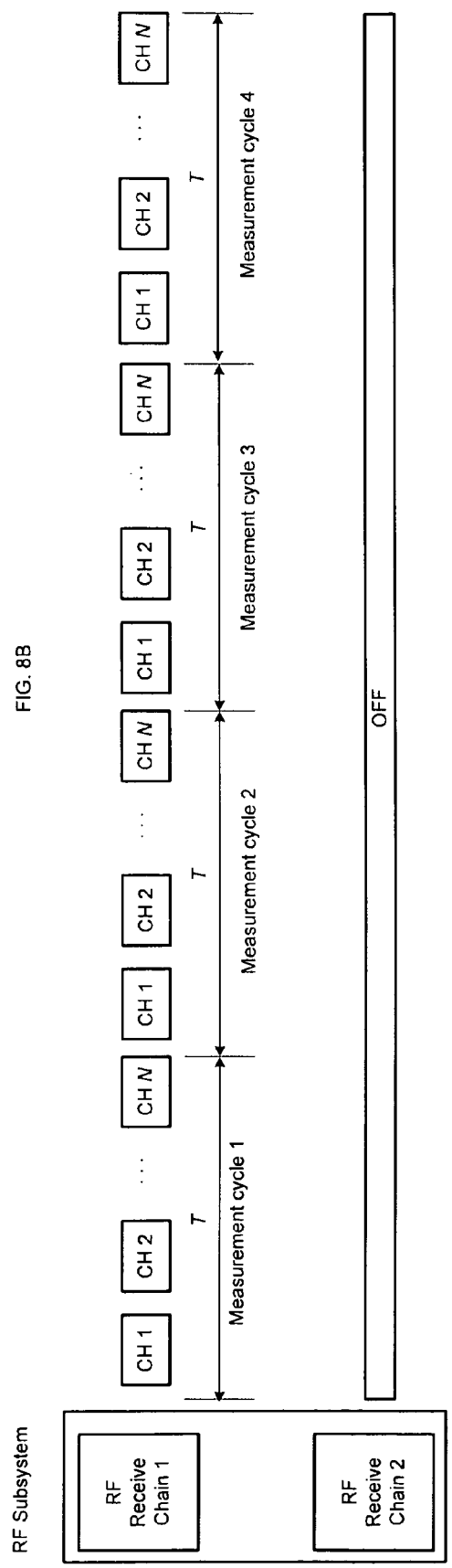
FIG. 8B illustrates a multiple receive chain signal level measurement process.

In another example, the signal level measurements step for an RF subsystem with two RF receive chains that can tune to the same RF channel is considered. This example is shown in FIG. 8B. For example, this may include the fixed architecture shown in FIG. 5 or the flexible, programmable architecture of FIG. 7. Regardless of which architecture is used, in this case both RF receive chains of the RF subsystem are tuned by the same synthesizer and hence at a given instant of time both RF receive chains can only tune to the same RF channel.

In this example the following scenarios may happen. In one scenario, one RF receive chain is used for signal level measurements and another RF receive chain is not used for signal level measurements and it may be turned off, put into standby mode or otherwise disabled to save power, although this is not required. In this scenario the time diversity and the time taken for measurements are similar to that of the signal level measurements step performed in a RF subsystem with one RF receive chain as shown in FIG. 8A.

Figure 8C:
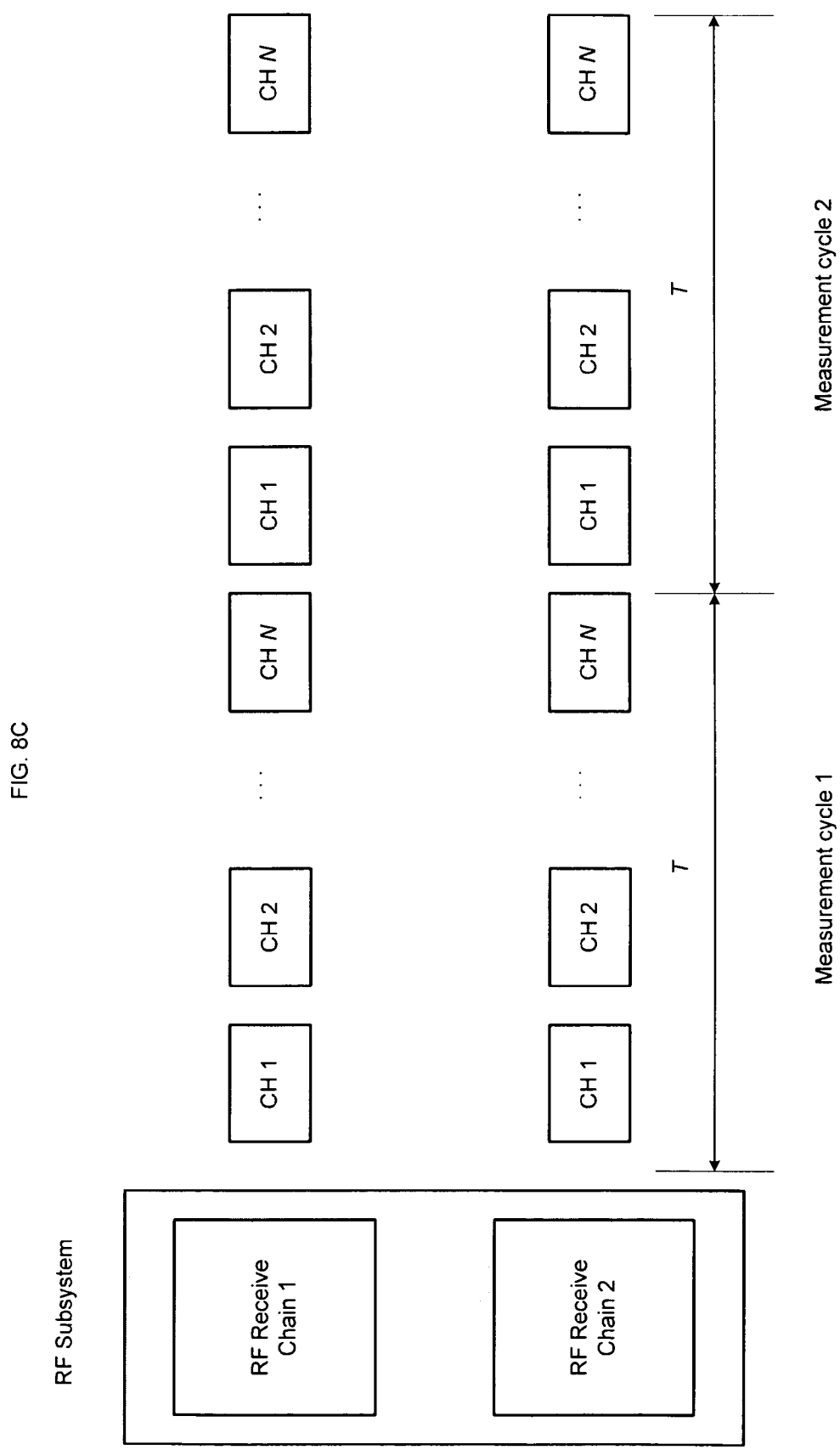
FIG. 8C illustrates another multiple receive chain signal level measurement process.

In another scenario, both RF receive chains of the RF subsystem may be used for signal level measurements on a set of N RF channels as shown in FIG. 8C. In this scenario, there are two measurements are performed on a single RF channel during a given measurement event. Therefore, the time taken to perform four measurements on all the N RF channels is 2T, which is half of the time taken to perform signal level measurements with one RF receive chain. In this scenario, time diversity is reduced but at the same time spatial diversity is achieved.

In accordance with aspects of the present invention, the set of RF channels on which measurements are performed is determined adaptively to reduce the total number of measurements performed during the network acquisition process. The architecture of FIG. 7 may be employed in this process, which enables effective and faster signal level measurements by taking advantage of the ability of the radio subsystem with multiple RF receive chains to simultaneously tune to different RF channels.

In one embodiment of the present invention, the number of RF channels on which measurements are to be performed for a given measurement cycle is determined adaptively. An initial set of RF channels on which signal level measurements is to be performed may be based on the criteria described above for performing signal level measurements on the required RF channels in the required frequency bands of the network acquisition process.

After each measurement cycle, the client terminal may compute signal level estimates from the available measurements for the set of RF channels for which measurements are performed in the last measurement cycle. One example of a signal level estimate is the average of the available measurements, although other signal level estimation techniques such as filtering may also be used. After signal level estimates are computed, the number of RF channels on which measurements may need to be performed for the next measurement cycle is determined based on one or more of the following criteria:

Criterion 1:

If the signal level estimate for a particular RF channel is less than a threshold THR1, then that RF channel may be removed from the set of RF channels for which measurements may need to be performed in the next measurement cycle. THR1 may be programmed in a register to represent an empirically determined value which corresponds to the minimum signal level that may be required to get service on a given wireless communication system. The threshold value may be determined by simulations and/or field data analysis. Once determined, a given value may be programmed to the register by the firmware in a controller/processor of the client terminal such as the MCU or SPU. The RF channels removed by this criterion are not considered any further for ongoing network acquisition processes.

Criterion 2:

If the signal level estimate for a particular RF channel is equal to or greater than a threshold THR2, then that RF channel may be removed from the set of RF channels for which measurements may need to be performed in the next measurement cycle. THR2 may be programmed in a register to an empirically determined value which corresponds to the minimum signal above which the RF channel is qualified for subsequent steps of the network acquisition process. As above, this threshold value may be determined by simulations and/or field data analysis. Once determined, a given value may be programmed to the register by the firmware in a controller/processor of the client terminal such as the MCU or SPU. Any RF channels removed by this criterion have already met the requirements to be considered for the next steps for the current network acquisition process.

An important aspect of the present invention is to adaptively remove RF channel(s) on which further measurements are not necessary after each measurement cycle. There may be other criteria that can be used in addition to criteria 1 and 2 or in place of criterion 1 and/or criterion 2. Criteria 1 and 2 are illustrative and not necessarily comprehensive. By way of example only, for RF channels that are known to be beacon channels based on a priori information, different thresholds can be used to qualify those RF channels.

To illustrate an adaptive method in accordance with aspects of the present invention, a set of 200 RF channels in an exemplary wireless communication system are chosen for the signal level measurements step. Also a maximum of four measurements per RF channel is chosen for this example. During the first measurement cycle, measurements are performed for all the 200 RF channels.

Now criteria 1 and 2 may be applied on the current signal level estimate of the 200 RF channels. By applying criteria 1 and 2 after the first measurement cycle, no RF channels may be removed and therefore all the 200 RF channels may be retained in the set of RF channels for the second measurement cycle.

In the second measurement cycle, for example, measurements may be performed on the set of all the 200 RF channels again. Now criteria 1 and 2 may be applied on the current signal level estimate of the 200 RF channels. In this example, due to the first criterion 150 RF channels may be removed from the set of 200 RF channels for further consideration. And in this example no RF channels may be removed due to criterion 2. Therefore, 50 RF channels are retained in the set of RF channels for the third measurement cycle.

After the third measurement cycle, again criteria 1 and criteria 2 may be applied on the current signal level estimate of the 50 retained RF channels. In this example, due to criterion 1 no RF channels may be removed while 20 RF channels may be removed from the set of 50 RF channels due to criterion 2. These 20 RF channels that are removed are added to the list of RF channels that may be considered for the second step of the network acquisition process.

Now the remaining 30 RF channels are retained in the set of RF channels for the fourth measurement cycle. After the fourth measurement cycle, criteria 1 and 2 may again be applied on the current signal level estimate of the 30 remaining RF channels. Here, for this example, no RF channels may be removed either due to criteria 1 or 2. Thus, all the 30 RF channels may be considered for the second step of the network acquisition process. Therefore, at the end signal level measurements step, a total of 50 RF channels may be considered for the second step of the network acquisition process (the 20 RF channels removed during the third measurement cycle plus the 30 RF channels which remained after the fourth measurement cycle).

In the above example, the adaptive signal level measurements method performed only 480 measurements compared to 800 measurements that may be performed by a conventional signal level measurements method. This leads to a significant reduction (here, a 40% reduction) in the number of signal level measurements. This in turn leads to a significant reduction in the signal level measurement time of the network acquisition process and a significant reduction in the power consumption of the client terminal.

While criteria 1 and 2 may both be applied after each measurement cycle, this is not required. For instance, after the first measurement cycle one or both criteria may not be applied when weeding out channels or identifying likely candidate channels.

FIG. 9 presents an exemplary operational process 200 of an adaptive measurement method in accordance with aspects of the present invention. As shown, at step S200 frequency bands on which signal level measurements need to be performed may initially be determined. The number of measurement cycles may be determined at this step as well, or may be otherwise set. At step S202, an initial set of RF channels to perform signal level measurements is determined. Then, at step S204, a measurement cycle is performed as described above.

Upon performance of the measurement cycle, criterion 1 may be applied to remove one or more RF channels from the set for a subsequent measurement cycle, as shown at step S206. Similarly, criterion 2 may be applied to remove RF channels from the set for a subsequent measurement cycle, as shown at step S208. Preferably, both criterion 1 and criterion 2 may be applied, although this is not required. For instance, in other examples only criterion 1 or criterion 2 is applied.

As shown at step S210, upon application of one or more criteria to remove RF channels, the removed RF channels from criterion 2 may be added to a set of RF channels for a subsequent step of a network acquisition process.

At step S212 a determination is made as to whether there are any RF channels left in the set under consideration. If any RF channels remain, then the process proceeds to step S214. Otherwise, the process proceeds to step S218, where network acquisition may continue as mentioned herein. At step S214 a determination is made as to whether the number of measurement cycles is less than the maximum number of measurement cycles.

If the maximum number of measurement cycles has not been reached, then the process returns to step S204 where another measurement cycle is performed as explained herein. Subsequent measurement cycles may employ one or both criteria upon measurement. However, this is not required. For instance, after a second measurement cycle is performed at step S204, one or both criteria may not be applied per steps S206 and S208 when weeding out channels or identifying likely candidate channels. If the maximum number of measurement cycles has been reached, then the process proceeds to step S216. Here, any remaining RF channels are added to the set of RF channels for use in subsequent network acquisition processes. For instance, next steps as shown in step S218 may include identifying potential beacon channels, verifying whether any of the identified channels are beacon channels, and/or synchronizing the client terminal to a verified beacon channel.

Figure 10:
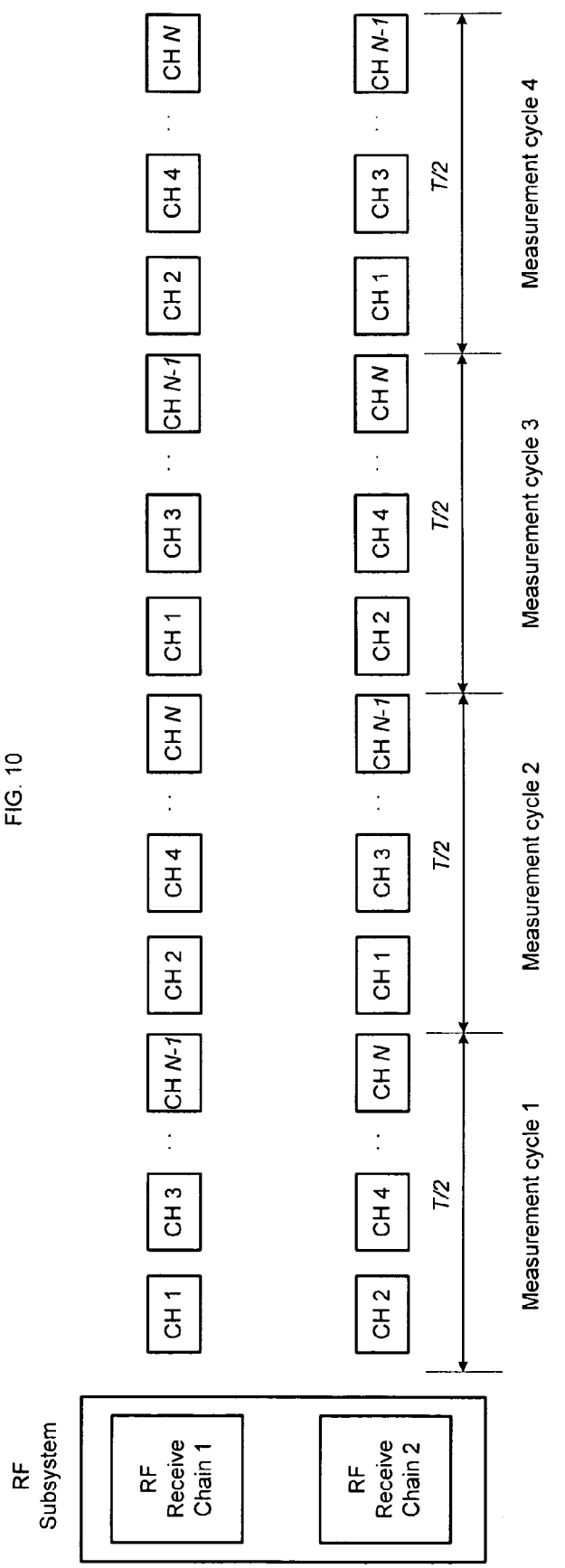
FIG. 10 provides a channel measurement illustration in accordance with aspects of the present invention.

According to another aspect of the present invention, the time needed to make signal level measurements may be further reduced by using all the available receive chains. To illustrate this aspect of the invention, the signal level measurements step for an RF subsystem with two RF receive chains that can simultaneously tune to the same or different RF channels is considered. In this example, signal level measurements on a set of N RF channels are performed. Four measurements per RF channel for all RF channels in the set is chosen for ease of illustration, as shown in FIG. 10. The number of RF channels N is chosen to be even for ease of illustration, as shown in FIG. 10.

In measurement cycle 1 as shown, during the first measurement event, RF receive chain 1 is tuned to RF channel 1 and RF receive chain 2 is tuned to RF channel 2 to perform measurements. For the second measurement event, RF receive chain 1 is tuned to RF channel 3 and RF receive chain 2 is tuned to RF channel 4 to perform measurements. This pattern continues until measurement event N/2, when RF receive chain 1 is tuned to RF channel N-1 and RF receive chain 2 is tuned to RF channel N to perform measurements. In other words, during measurement cycle 1, for the set of N RF channels, RF receive chain 1 may be used for odd numbered channels while RF receive chain 2 may be used for even numbered channels.

The time taken for the measurement cycle 1 to perform the first set of measurements on all the N RF channels is T/2.

In measurement cycle 2, during the first measurement event, RF receive chain 1 is tuned to RF channel 2 and RF receive chain 2 is tuned to RF channel 1 to perform measurements. For the second measurement event, RF receive chain 1 is tuned to RF channel 4 and RF receive chain 2 is tuned to RF channel 3 to perform measurements. This pattern may continue until reaching measurement event N/2. Here, RF receive chain 1 may be tuned to RF channel N while RF receive chain 2 may be tuned to RF channel N-1 to perform measurements. In other words, during measurement cycle 2, for the set of N RF channels, RF receive chain 1 is used for even numbered RF channels and RF receive chain 2 is used for odd numbered RF channels. The time taken for the measurement cycle 2 to perform the second set of measurements on all the N RF channels is T/2.

If the number of RF channels N is odd, then there are (N+1)/2 measurement events. Also one of the two RF chains is not used for signal level measurements during the last measurement event in each measurement cycle. The unused RF chain may be turned off, put into standby mode or otherwise disabled to save power, although this is not required.

This alternating pattern of measurements using RF receive chain 1 and RF receive chain 2 may be repeated for measurement cycles 3 and 4. The time taken to perform four measurements on all the N RF channels is 2T.

The pattern in which the RF receive chains are used for a given RF channel in different measurement cycles is only an example. Other patterns may be used. As shown, for a given RF channel a different RF receive chain may be used in consecutive measurements, although this is not required.

Using a first RF receive chain to handle the even channels while a second RF receive chain handles the odd channels in a first cycle and then switching so that the first RF receive chain handles the odd channels in a next cycle while the second RF receive chain handles the even channels in that cycle promotes spatial diversity.

In the above example, four measurements are performed for each RF channel and two measurements are taken on each RF receive chain. However, for a given RF channel only one measurement may be taken at any given instant either using RF receive chain 1 or RF receive chain 2. Thus, all four measurements may be taken at different time instants, which may result in better time diversity when compared to measurements performed by a conventional method as shown in FIG. 8C. Thus, it can be seen that in this aspect of the invention better time diversity is achieved while maintaining the same degree of spatial diversity.

Figure 11:
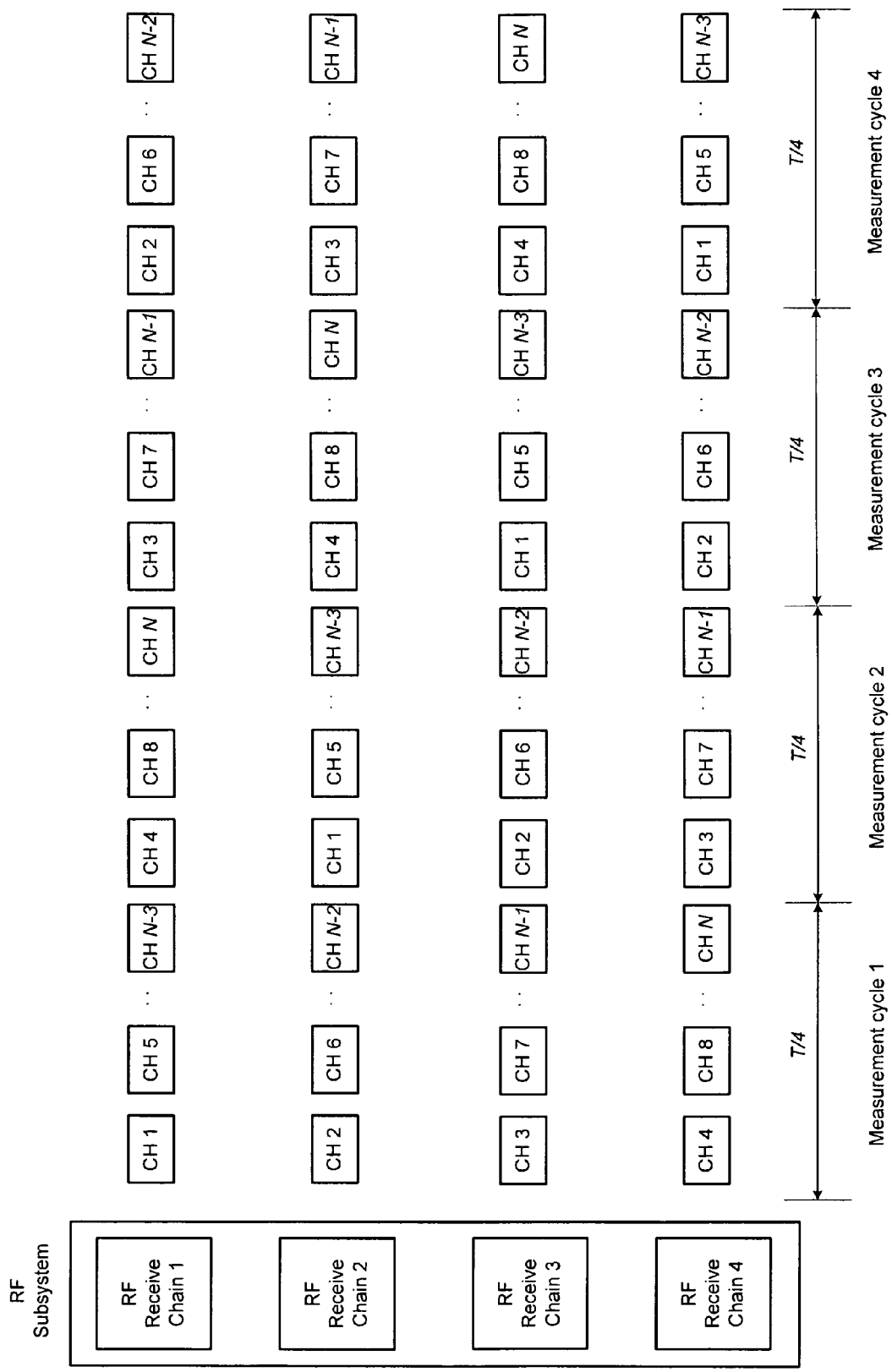
FIG. 11 provides another channel measurement illustration in accordance with aspects of the present invention.

Furthermore, while only two receive chains are illustrated in the example of FIG. 10, more than two receive chains may also be used. For instance, FIG. 11 illustrates another example wherein four receive chains are employed. Here, for the case where N channels are to be evaluated, different groups of channels are assigned to each receive chain during a given measurement cycle. By way of example, a first group may include channels 1, 5, . . . , N-3. A second group may include channels 2, 6, . . . , N-2. A third group may include channels 3, 7, . . . , N-1. And a fourth group may include channels 4, 8, . . . , N. For this example N is chosen to be multiple of 4.

As shown in FIG. 11, during a first measurement cycle the first group may be assigned to the first receive chain, the second group may be assigned to the second receive chain, the third group may be assigned to the third receive chain, and the fourth group may be assigned to the fourth receive chain. Then, in the next measurement cycle, the first group may be assigned to the second receive chain, the second group may be assigned to the third receive chain, the third group may be assigned to the fourth receive chain, and the fourth group may be assigned to the first receive chain. A similar progression may take place for subsequent measurement cycles, for instance so that in the next (e.g., third) measurement cycle, the first group may be assigned to the third receive chain, the second group may be assigned to the fourth receive chain, the third group may be assigned to the first receive chain, and the fourth group may be assigned to the second receive chain. Thus, there may be a circular-type rotation of channel groups among the receive chains, although other types of channel group rotations may be employed.

Furthermore, adaptive criteria as discussed herein may be used with this and other embodiments to remove certain channels from subsequent measurement cycles. For instance, a given channel in the initial set of channels may not be used in an updated set of channels in the next measurement cycle. The channel may not be included for different reasons, e.g., it fails to meet a minimum signal level necessary for service on the wireless network. Conversely, the channel may exceed a threshold which identifies the channel as a potential beacon channel and thus the channel is further evaluated in subsequent stages of a network acquisition process.

Thus, while the same channels are shown in the different measurement cycles in the examples, it should be understood that not all channels may be evaluated during each measurement cycle. Grouping of channels may be reevaluated and/or reconfigured for a next measurement cycle based on the remaining channels. In one scenario, channels may be grouped for a given measurement cycle (and/or regrouped for the next measurement cycle) to maximize time and spatial diversity. This may be done for some or all measurement cycles. In another scenario, in addition to grouping/regrouping of channels, some or all of the available receive chains are assigned to maximize time and spatial diversity as well as to reduce power consumption.

For instance, in the example of FIG. 11, if the number of channels to be evaluated during a particular measurement cycle is not a multiple of four, then up to three of the four receive chains may not be used for signal level measurements during the last measurement event in the measurement cycle. The receive chain(s) which are not used during the last measurement event may be placed in standby mode, powered off or otherwise disabled to reduce power consumption.

It should be understood that the RF channel numbers used in the above description are not the actual channel numbers that may be defined in a radio profile or other means. Rather, the numbering in the above description indicates the number of the RF channel within the set considered. Again, an important aspect of the invention is that for a given RF channel, different RF receive chains may be used in consecutive measurements.

Another aspect of the present invention incorporates adaptively determining the number of RF channels on which measurements are performed and the effective use of the ability of the radio subsystem with multiple RF receive chains that can simultaneously tune to different RF channels. The combination of these two features may significantly reduce network acquisition time and also significantly reduce the power consumption of a user's mobile device.

Aspects of the present invention may be implemented in firmware of a controller/processor of the client terminal such as the MCU or the SPU of the baseband subsystem. In another alternative, aspects of the present invention may also be implemented as a combination of firmware and hardware of the baseband subsystem. The wireless subsystem of the mobile terminal, such as RF subsystem 100, may be controlled by the MCU or the SPU of the baseband subsystem, by a dedicated wireless subsystem controller, other processor or the like. The terms controller and processor are used interchangeably herein.

In accordance with aspects of the present invention, numerous benefits and advantages over known client terminals may be obtained. For instance, use of adaptive signal measurement criteria enables faster network acquisition. The less time the client terminal spends finding the appropriate network, the quicker a user may make or receive calls. Use of the radio subsystem with multiple RF receive chains that can simultaneously tune to different RF channels may achieve additional time diversity and improve the reliability of the signal level measurements. Such improvement may be especially significant for mobile client terminals where they are expected to undergo different fading environment.

Furthermore, the combination of adaptive signal measurement criteria and innovative use of a radio subsystem(s) with multiple RF receive chains that can simultaneously tune to different RF channels can result in further reduction in the network acquisition time.

In addition, a significant reduction in power consumption may be achieved in many scenarios. For example, in a scenario where there is no network coverage, the client terminal may periodically perform signal level measurements to check for network availability. Power consumption depends on the amount of time the client terminal spends to perform signal level measurements. Therefore, fast and reliable signal level measurements can reduce the power consumption significantly. This is a significant advantage for battery operated mobile client terminals.

Aspects of the present invention for radio subsystems with multiple RF receive chains that can simultaneously tune to different RF channels for faster or reliable signal measurement purposes can be applied to other entities of a wireless communication system. By way of example, base stations may also benefit through better diversity, which leads to more reliable signal quality and signal strength metrics.

Furthermore, various aspects of the present invention may be applied to other processes that employ signal level measurements. For example, a user initiated network search may employ the transceiver architecture of FIG. 7 and the procedure of flow diagram 9 to find possible base stations upon request by the user.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

For instance, one or more different criterion may be implemented using some or all of the examples provided herein. The same or different criteria may be used across multiple measurement cycles. A given criterion may dynamically change from cycle to cycle to optimize results. Furthermore, while various processes have been shown in certain orders for ease of illustration, it should be understood that specific operations are not required to be performed in the exact order shown unless expressly stated herein.

The invention claimed is:

1. A method, comprising:
providing a wireless receiver for operating on a wireless communication system having a plurality of channels, the wireless receiver having a plurality of receive chains for receiving signals from the plurality of channels;
determining an initial set of channels to perform signal level measurements on;
performing an initial measurement cycle on the initial set of channels using the plurality of receive chains, the plurality of receive chains tuning simultaneously to different channels in the initial set and returning a corresponding initial set of signal level measurements for each of the channels in the initial set of channels;
applying a criterion to each initial signal level measurement for each channel in the initial measurement cycle; and
generating an updated set of channels to perform a subsequent measurement cycle on based on the criterion;
wherein if a given initial signal level measurement for a given channel satisfies the criterion, then the given channel is omitted from the updated set of channels to perform the subsequent measurement cycle on.

2. The method of claim 1, wherein the criterion is a signal level threshold corresponding to a minimum signal level sufficient to obtain service on the wireless communication system.

3. The method of claim 1, wherein the criterion is a signal level threshold corresponding to a minimum signal level above which the given initial signal level measurement qualifies for consideration as a beacon signal, and if the given initial signal level measurement satisfies the criterion, then the method further comprises adding the given channel to a list of potential beacon signal channels.

4. The method of claim 1, further comprising performing the subsequent measurement cycle on the updated set of channels using the plurality of receive chains, the plurality of receive chains tuning simultaneously to different channels in the updated set and returning a subsequent set of signal level measurements.

5. The method of claim 4, further comprising applying the criterion to each subsequent signal level measurement for each channel in the updated set after the subsequent measurement cycle.

6. The method of claim 1, further comprising assigning a first group of the initial set of channels to a first one of the plurality of receive chains and assigning a second group of the initial set of channels to a second one of the plurality of receive chains prior to performing the initial measurement cycle.

7. The method of claim 6, wherein the first group is a set of even-numbered channels and the second group is a set of odd-numbered channels.

8. The method of claim 1, wherein:
the criterion is a first criterion associated with a first threshold;
applying the criterion further includes applying a second criterion associated with a second threshold to each initial signal level measurement for each channel in the initial measurement cycle;
if the given initial signal level measurement for the given channel does not exceed the first threshold, then the given channel is omitted from the updated set of channels;
if the given initial signal level measurement for the given channel exceeds the second threshold, then qualifying the given channel for consideration as a beacon signal and omitting the given channel from the updated set of channels; and
if the given initial signal level measurement for the given channel exceeds the first threshold and does not exceed the second threshold, then adding the given channel to the updated set of channels.

9. The method of claim 8, wherein the second criterion is only applied to the initial signal level measurement of a selected channel if that measurement exceeds the first threshold.

10. The method of claim 1, further comprising:
assigning even numbered ones of the initial set of channels to a first one of the plurality of receive chains for the initial measurement cycle and assigning odd numbered ones of the initial set of channels to a second one of the plurality of receive chains for the initial measurement cycle; and
assigning odd numbered ones of the updated set of channels to the first one of the plurality of receive chains for the subsequent measurement cycle and assigning even numbered ones of the updated set of channels to the second one of the plurality of receive chains for the initial measurement cycle.

11. An RF subsystem for use in a wireless device, the RF subsystem comprising:
a transmitter operable to process input signals and to send out the processed input signals from the wireless device;
a plurality of synthesizers, a first one of the plurality of synthesizers being operable to generate a first local oscillating signal in response to a first synthesizer control signal, and a second one of the plurality of synthesizers being operable to generate a second local oscillating signal in response to a second synthesizer control signal; and
a plurality of receive chains being operable to receive a plurality of signals from a corresponding plurality of channels in a wireless communication network, to analyze the plurality of received channel signals and to output selected ones of the received channel signals in a network acquisition process;
a first one of the plurality of receive chains receiving the first local oscillating signal from the first synthesizer and tuning to a first set of the plurality of channels during a first measurement cycle based on the first local oscillating signal and sequentially measuring each received channel signal for the first set of channels;
a second one of the plurality of receive chains receiving the second local oscillating signal from the second synthesizer and tuning to a second set of the plurality of channels during the first measurement cycle based on the second local oscillating signal and sequentially measuring each received channel signal for the second set of channels;
wherein the first and second receive chains are tuned simultaneously to different channels during the first measurement cycle.

12. The RF subsystem of claim 11, wherein the first set of channels comprises odd numbered channels in a frequency band of the wireless communication network and the second set of channels comprises even numbered channels in the frequency band.

13. The RF subsystem of claim 11, wherein during a second measurement cycle:
the first receive chain tunes to at least some of the second set of channels and sequentially measures each received channel signal for at least some of the second set of channels; and
the second receive chain tunes to at least some of the first set of channels and sequentially measures each received channel signal for at least some of the first set of channels.

14. The RF subsystem of claim 11, wherein if there is an odd number of channels then one of the first and second receive chains is not used for signal level measurements during a last measurement event in the first measurement cycle.

15. The RF subsystem of claim 11, wherein after the received channel signals for the first and second sets of channels are measured, a criterion is applied to each measurement, and if a given measurement satisfies the criterion, then the channel corresponding to the given measurement is not included in an updated channel set for use in a subsequent measurement cycle.

16. The RF subsystem of claim 15, wherein if there is an odd number of channels during the subsequent measurement cycle, then one of the first and second receive chains is not used for signal level measurements during a last measurement event in the subsequent measurement cycle.

17. The RF subsystem of claim 15, wherein channels remaining in the updated channel set are regrouped to maximize time and spatial diversity for the subsequent channel measurement cycle.

18. The RF subsystem of claim 15, wherein:
the criterion is a first criterion associated with a first threshold;
applying the criterion further includes applying a second criterion associated with a second threshold to each measurement;
if the given measurement does not exceed the first threshold, then the channel corresponding to the given measurement is omitted from the updated channel set;

if the given measurement exceeds the second threshold, then the channel corresponding to the given measurement is qualified for consideration as a beacon signal and the corresponding channel is omitted from the updated channel set; and if the given measurement exceeds the first threshold and does not exceed the second threshold, then the corresponding channel is added to the updated channel set.

19. The RF subsystem of claim 18, wherein the second criterion is only applied to the given measurement if that measurement exceeds the first threshold.

20. The RF subsystem of claim 11, wherein the wireless device is a mobile station.

21. The RF subsystem of claim 11, wherein the wireless device is a base station.

22. A wireless mobile station for use on a wireless communication network, the wireless mobile station comprising:
a baseband subsystem including a controller and a signal processing unit operatively connected to the controller; and
a radio frequency subsystem operatively connected to the baseband subsystem, the radio frequency subsystem including a plurality of receive chains being operable to receive a plurality of signals from a corresponding plurality of channels in the wireless communication network, to analyze the plurality of received channel signals and to output selected ones of the received channel signals in a network acquisition process;
a first one of the plurality of receive chains tuning to a first set of the plurality of channels during a channel measurement cycle and sequentially measuring each received channel signal for the first set of channels;
a second one of the plurality of receive chains tuning to a second set of the plurality of channels during the channel measurement cycle and sequentially measuring each received channel signal for the second set of channels;
wherein the first and second receive chains tune simultaneously to different channels during the channel measurement cycle.

23. The wireless mobile station of claim 22, wherein one of the baseband subsystem and the radio frequency subsystem further comprises a controller for managing one or more thresholds used to analyze the received channel signals in the network acquisition process.

24. The wireless mobile station of claim 23, wherein:
if a measured channel signal does not exceed a first threshold, then the channel corresponding to the measured channel signal is omitted from an updated channel set in a subsequent channel measurement cycle; and
if the measured channel signal exceeds a second threshold, then the channel corresponding to the measured channel signal is qualified for consideration as a beacon signal in the network acquisition process and the corresponding channel is omitted from the updated channel set.

25. The wireless mobile station of claim 23, wherein:
the channel measurement cycle is a first measurement cycle;
the one or more thresholds are used to remove channels from evaluation for a subsequent channel measurement cycle; and
the first and second sets of channels are regrouped to maximize time and spatial diversity for the subsequent channel measurement cycle.

26. The wireless mobile station of claim 25, wherein remaining channels are regrouped and the plurality of receive chains are reassigned prior to a given measurement cycle to maximize time and spatial diversity and to reduce power consumption during the given channel measurement cycle.

* * * * *